United States Patent
Samah

(10) Patent No.: US 8,643,463 B2
(45) Date of Patent: Feb. 4, 2014

(54) POROUS FILM SENSOR

(75) Inventor: Zuruzi Bin Abu Samah, Singapore (SG)

(73) Assignee: Nanyang Polytechnic, Singapore (SG)

( * ) Notice: Subject to any disclaimer, the term of this patent is extended or adjusted under 35 U.S.C. 154(b) by 0 days.

(21) Appl. No.: 13/512,392

(22) PCT Filed: Nov. 30, 2009

(86) PCT No.: PCT/SG2009/000458
§ 371 (c)(1),
(2), (4) Date: May 29, 2012

(87) PCT Pub. No.: WO2011/065921
PCT Pub. Date: Jun. 3, 2011

(65) Prior Publication Data
US 2012/0235781 A1 Sep. 20, 2012

(51) Int. Cl.
*H01C 7/00* (2006.01)
(52) U.S. Cl.
USPC .................................................. 338/13
(58) Field of Classification Search
USPC .................................................. 338/13
See application file for complete search history.

(56) References Cited

U.S. PATENT DOCUMENTS

| | | | |
|---|---|---|---|
| 7,183,551 B2* | 2/2007 | Itoh | 250/338.1 |
| 7,194,912 B2 | 3/2007 | Jordan et al. | |
| 7,435,310 B2 | 10/2008 | Roberts et al. | |
| 7,686,994 B2* | 3/2010 | Prasad et al. | 264/101 |
| 7,705,376 B2* | 4/2010 | Ishida et al. | 257/253 |
| 2005/0109617 A1* | 5/2005 | Ono et al. | 204/400 |
| 2006/0035085 A1 | 2/2006 | Toyokazu et al. | |
| 2006/0199002 A1 | 9/2006 | Abaneshwar et al. | |
| 2008/0191585 A1 | 8/2008 | Pelrine et al. | |
| 2008/0299030 A1 | 12/2008 | Rinzler et al. | |
| 2009/0008142 A1 | 1/2009 | Shimizu et al. | |
| 2009/0013792 A1 | 1/2009 | Qiao et al. | |
| 2009/0056854 A1* | 3/2009 | Oh et al. | 156/60 |
| 2009/0289212 A1 | 11/2009 | Schroeer | |
| 2010/0111813 A1* | 5/2010 | Fan | 423/447.1 |
| 2010/0297449 A1* | 11/2010 | Kitano et al. | 428/408 |
| 2011/0091711 A1* | 4/2011 | Neivandt et al. | 428/304.4 |

FOREIGN PATENT DOCUMENTS

WO   WO 2004-053464   6/2004

OTHER PUBLICATIONS

Li, X., et al., "Compression-Modulated Tunable-Pore Carbon-Nanotube Membrane Filters," *Small*, 1-5 (2005).

* cited by examiner

*Primary Examiner* — Kyung Lee
(74) *Attorney, Agent, or Firm* — Womble Carlyle Sandridge & Rice LLP

(57) ABSTRACT

A method of forming a film is described. The method begins by forming a mixture including a polymer and a plurality of unordered nanomaterial. The film is dried and a plurality of pores is formed within the film. A sensitive film transducer capable of detecting changes in pressure and applied force can be made using this method.

25 Claims, 4 Drawing Sheets

POROUS FILM SENSOR

CROSS-REFERENCE TO RELATED APPLICATIONS

The present application is a national phase of International Application PCT/SG09/000458, filed Nov. 30, 2009, which is herein incorporated by reference in its entirety.

FIELD OF THE INVENTION

This invention relates to a film made of a polymer and nanomaterials. More particularly, this invention relates to the formation of pores in the film. Still more particularly, this invention relates to a pressure transducer made of the film that has a greater sensitivity because of pores in the film.

DESCRIPTION OF PRIOR ART

There are many types of film sensors. These film sensors are commonly used in devices that measure acceleration, force, or pressure. However, commonly available film sensors typically have inherent problems such as thermal budget restrictions of the underlying substrates, mechanical integrity of the sensors on a flexible substrate, surface roughness of film substrates, signal routing, adhesion of metals to polyimide substrates, cross-talk between sensors, power supply requirements, high cost and unacceptable manufacturing requirements.

Moreover, current flexible sensors often do not provide real-time feedback that can be used to adjust a stimulus, such as touch, force, acceleration and flow, or the operational characteristics of a device to compensate for the stimulus. Even if possible, the range of measurements that current sensors are able to measure lack the required sensitivity for certain applications, like health-care, automotive or consumer industries. Thus, currently available film sensors are not desirable for use in these industries.

A particular problem with the prior art film sensors is that the films are rigid or semi-rigid. The rigidity of the films is often due to the fact that these film sensors are made of multiple layers. For example, commonly available force sensors are made using two layers of either polyester or polyimide. On each layer, a conductive material is applied, followed by a layer of pressure-sensitive ink. When the force sensor is unloaded, the resistance of the film is very high because the ink is separated by a gap between the layers. When a force is applied to the sensor, the resistance decreases as the distance between the inks on the layers decreases. As the sensor must be able revert to the original state after the application of a force, the choice of materials used to form the layers is restricted. This restriction in the type of material used for layers in turn limits the sensitivity of these types of sensors.

Accordingly, there is a need in the art for a film that does not depend on such a two layer structure in order to provide a flexible, sensitive, non-intrusive, real-time, low cost, readily available feedback device to measure and assess acceleration, force and/or pressure.

SUMMARY OF INVENTION

The above and other problems are solved and an advance in the art is made by a film comprising polymer, nanomaterials and pores; and a method in accordance with this film. A first advantage of a film in accordance with this invention is that the film contains pores that make the film more amenable to deformation. A second advantage of a film in accordance with this invention is that the conductivity of the film is improved. A third advantage of a film in accordance with this invention is that the use of the film improves detection or measurement at a lower pressure range.

In accordance with embodiments of this invention, a method of forming a film having a polymer and nanomaterials is performed in the following manner. A polymer and unordered nanomaterials are mixed to form a mixture. The mixture is then dried in a process that will form pores within the film. In some embodiments of this invention, the nanomaterial is carbon nanotubes. In some of these embodiments, the carbon nanotubes are multi-walled carbon nanotubes. In others of these embodiments, the carbon nanotubes are single-walled carbon nanotubes. Other examples of nanomaterials that may be used include, but are not limited to, nanowires. In yet other embodiments of this invention, the polymer is electrically insulating and the nanomaterial is electrically conducting.

In accordance with one of the embodiments of this invention, the mixture of polymer and nanomaterials further includes isopropyl alcohol. The isopropyl alcohol in the film is evaporated to form pores. These pores separate the carbon nanotubes in the film. In some embodiments of this invention, the drying process is aided by heating the film for a predetermined amount time at a predetermined temperature. In some particular embodiments, the film may be heated for between about 20 minutes to about 600 minutes and—or at a temperature range of about 25 degrees Celsius to about 90 degrees Celsius. In yet some other embodiments in accordance with this invention, the film may be heated for approximately 20 minutes at a temperature of substantially 60 degrees Celsius. In still other embodiments in accordance with this invention, the film is heated under a specified pressure. In particular ones of these embodiments, the film may be heated under a pressure in a range from substantially 0.001 atm to substantially 1 atm.

In some embodiments of this invention, the resulting film has a uniform thickness in the range of 100 nanometers to 1000 micrometers. In some other embodiments of this invention, the film is 0.5 mm thick.

In some embodiments of this invention, the pores are each substantially 100 nanometers to 500 micrometers in size. The pores may be uniform or non-uniform in sizes. Typically, the density of the pores in the film is between 5 to 75 percent by volume.

In some embodiments of this invention, characteristics of the film changes significantly in a pressure range of substantially 0.5 kPa to 100 kPa.

DESCRIPTION OF DRAWINGS

The above and other features and advantages of a film in accordance with this invention are described in the following Detailed Description and are shown in the following drawings.

DETAILED DESCRIPTION

Figure 1:
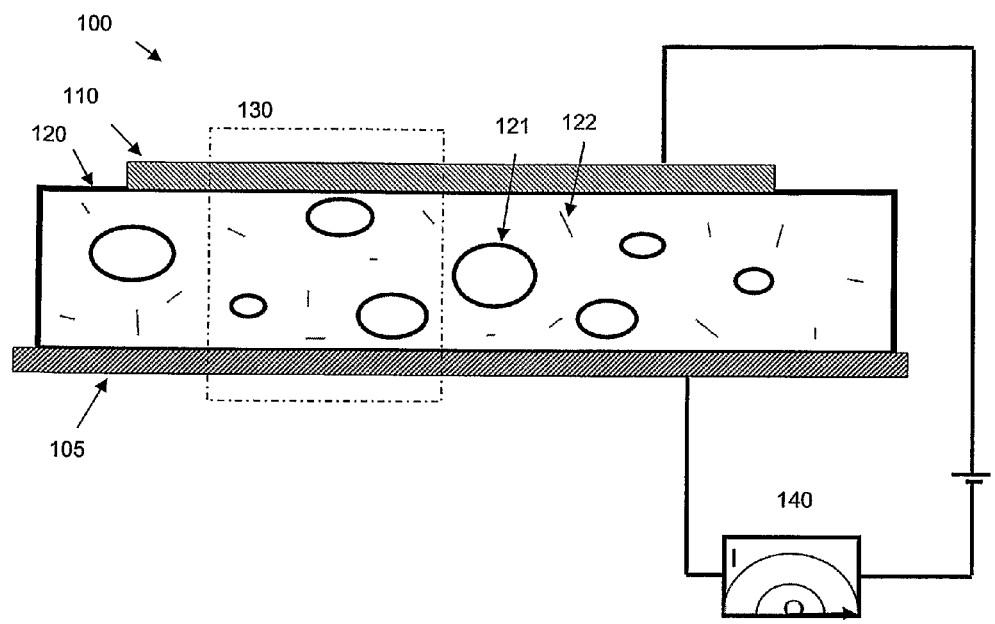
FIG. 1 illustrating cross sectional side view of an embodiment of a film in accordance with this invention without a force applied.
Figure 2:
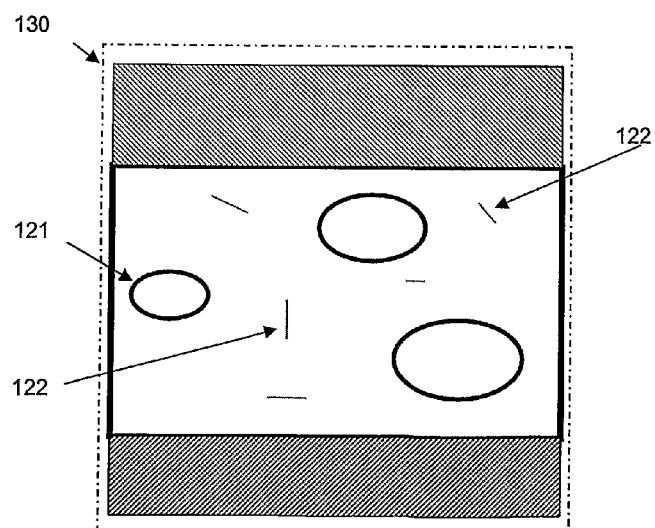
FIG. 2 illustrating a magnified cross section side view of the embodiment shown in FIG. 1.

This invention relates to a film made of a polymer and nanomaterials. More particularly, this invention relates to the formation of pores in the film. Still more particularly, this invention relates to a pressure transducer made of the film that has a greater sensitivity because of pores in the film. FIGS. 1-5 illustrate one particular embodiment of a pressure transducer in accordance with this invention, and FIG. 6 illustrates the results in terms of sensitivity of such an embodiment. For clarity, a component shown in more than one figure has been given the same reference numeral in the different figures.

FIG. 1 shows pressure sensor 100 including film 120 that is an exemplary embodiment of this invention. No force is applied to pressure sensor 100. Film 120 is made of an electrically insulating polymer with electrically conducting carbon nanotubes 122. Other examples of nanomaterials that may be used include, but are not limited to, nanowires. One example of an electrically insulating polymer is polydimethylsiloxane (PDMS). However, one skilled in the art will recognize that any other nanomaterials and any other electrically insulating polymer can also be used without departing from this invention.

In the described embodiment, carbon nanotubes 122 are tubular forms of carbon and can have diameters from a few nanometers and lengths up to a few millimetres. The length-to-diameter ratios of carbon nanotubes 122 can be as large as 28,000,000:1 and are a hundred times stronger than steel at one-sixth of its weight. Carbon nanotubes 122 may be any one of many different forms, including, but not limited to, single-wall carbon nanotubes and multi-wall carbon nanotubes.

An inset view 130 of the film 120 shows carbon nanotubes 122 dispersed throughout the film in a random unordered fashion. For purposes of this description, "unordered" means that the carbon nanotubes 122 are not arranged in any particular way and do not form any consistent or repetitive patterns. The concentration of carbon nanotubes 122 can be in the range of 4 to 12 mass percent of the polymer. The higher the concentration of carbon nanotubes 122 in film 120 will increase the sensitivity of pressure sensor 100. Likewise, the lower the concentration of carbon nanotubes 122 in film 120 will decrease the sensitivity of pressure sensor 100. In one of the preferred embodiments, the concentration of carbon nanotubes 122 is in the range of 4 to 8 mass percent of the polymer. This range of 4 to 8 mass percent gives an optimum performance for pressure sensor 100.

Pores 121 are formed within film 120. Pores 121 are spaces or voids within film 120. Pores 121 may contain air or gas. The exact contents of pores 121 are not important in accordance with this invention and are omitted for brevity. Carbon nanotubes 122 are physically separated from one another by pores 121 as is clearly shown in FIG. 2. The separation between carbon nanotubes 122 increases the resistivity of film 120. Further, pores 121 lower the mechanical properties of film 120, relative to a pore-free composite. Thus, film 120 is amenable to deformation. Hence, pores 121 improve detection and measurement capabilities of film 120, particularly at lower pressure ranges. Further details regarding pores 121 are disclosed later in the specification.

Contacts 105 and 110 are in contact with film 120. These contacts can be made of metal, although any material that conducts electricity can be used. Sputtering is often used to lay these contacts on a film or surface. Other deposition techniques can also be used to lay metals or other electrically conducting materials on the film. These can be combined with masking of the film to achieve ideal shapes on the film.

Ammeter 140 is representative of circuitry in pressure sensor 100 that measures the amount of current flowing through pressure sensor 100. The exact configuration of the circuitry is not important in accordance with this invention and is omitted for brevity. Since no force is being applied to pressure sensor 100, ammeter 140 records a low current due to film 120 having a high resistance.

Figure 3:
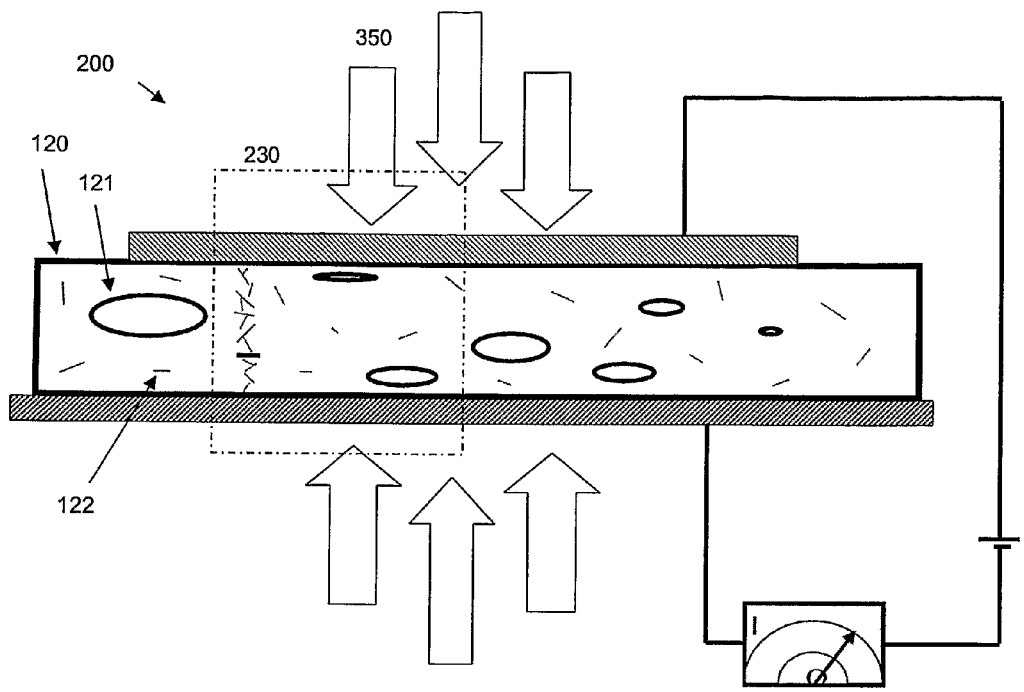
FIG. 3 illustrating a cross sectional side view of the embodiment shown in FIG. 1 being deformed due to a force applied to the film.

FIG. 3 shows film 120 as force 350 is applied to film 120. Force 350 may be any type of force including a force resulting from pressure, physical impact, or any other action. As force 350 is applied, film 120 deforms. Inside film 120, pores 121 are compacted by the force. The compaction of pores 121 allows film 120 to be more flexible and deform more, relative to a film without pores. Furthermore, as pores 121 are compacted, spacing between carbon nanotubes 122 decreases and, in turn, increases the conductivity of carbon nanotubes 122 and decreases the resistivity of film 120.

Figure 4:
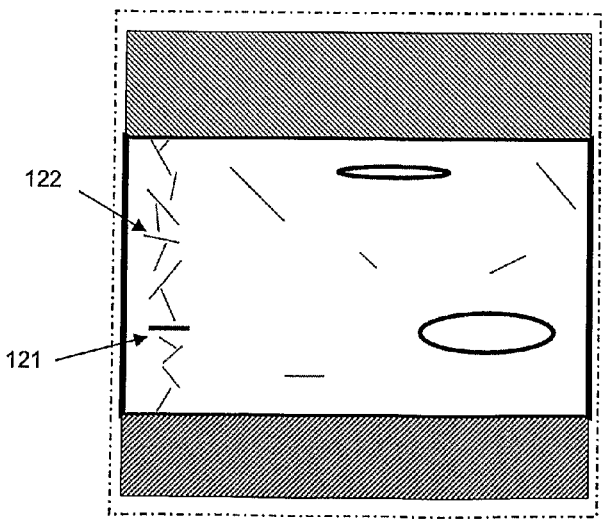
FIG. 4 illustrating a magnified cross section side view of the embodiment shown in FIG. 3.

FIG. 4 shows an inset view of 230 which highlights the deformation of the pores 121. Several carbon nanotubes 122 are shown in contact with each other. Thus, a percolating path between the contacts 105 and 110 is formed by carbon nanotubes 122. The percolating path lowers the resistance of the film overall and such an effect can be charted and seen in FIG. 6.

The film in accordance with this invention can be used as a pressure sensing devices. The film can also be used in a number of applications where there is a need to detect pressure or forces. Such applications may be applied in products, including, but not limited to, biomedical products and automation systems. One such application is the incorporation of film 120 into flexible mats to sense pressure distribution across the feet of a person for gait analysis. In some embodiments, film 120 may also be used as sensors to transduce pressure to electrical signals to control systems. One skilled in the art will recognize that the uses of film 120 described herein are meant to be illustrative purposes and film 120 may be used in a variety of applications that require a pressure sensor without departing from this invention.

Figure 5:
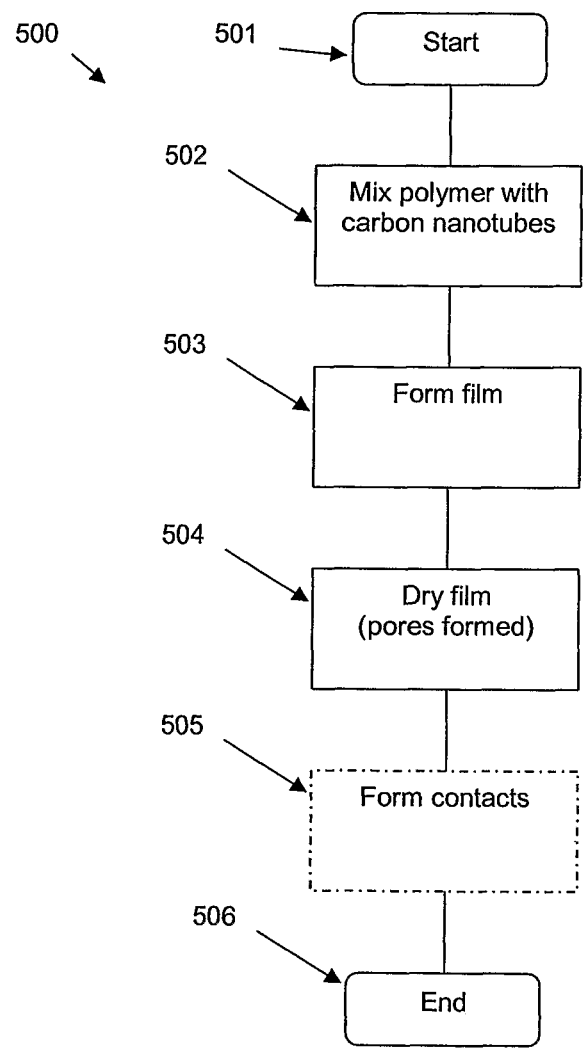
FIG. 5 illustrating flowchart of an embodiment of a process for fabricating a film in accordance with this invention.
Figure 6:
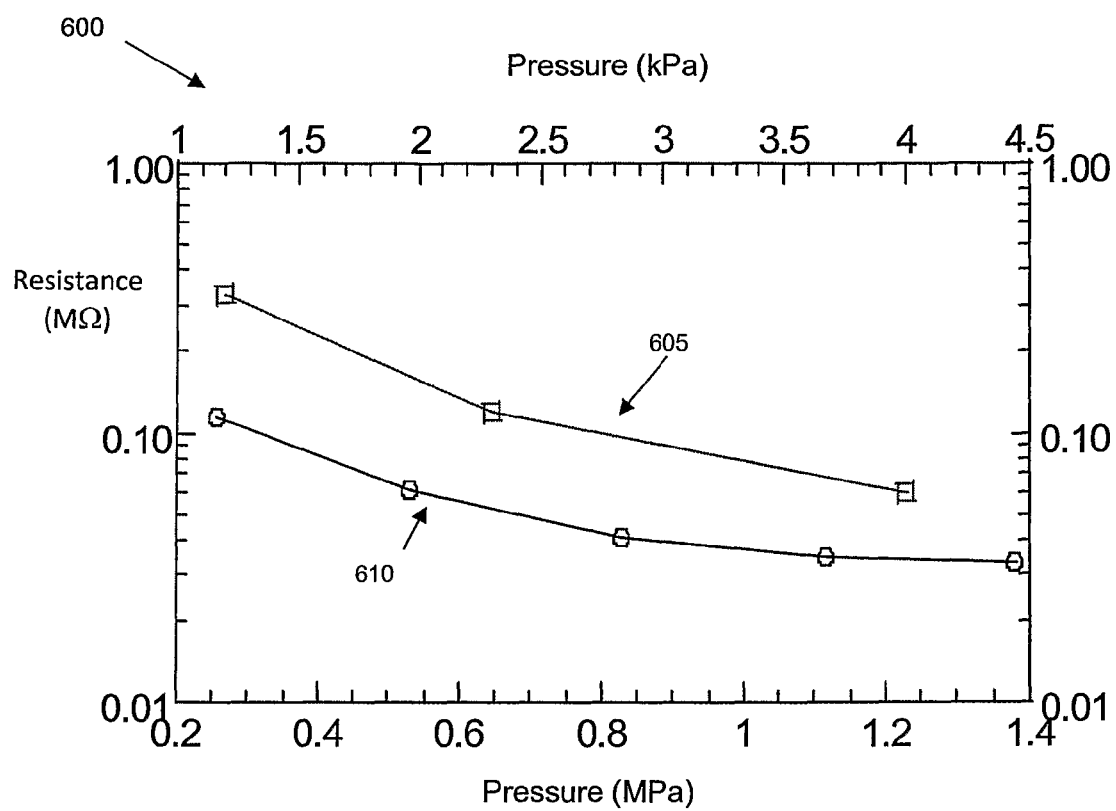
FIG. 6 illustrating experimental results from an embodiment of a pressure sensor compared in accordance with this invention compared to a prior art sensor.

FIG. 5 shows an exemplary process 500 for fabricating film 120 in accordance with one embodiment of this invention. Process begins in step 502 by mixing in carbon nanotubes 122 into the polymer to form a mixture. The mixing can be done via manual stirring, magnetic stirring as well as ultrasonic agitation. The carbon nanotubes are commercially available carbon nanotubes. Film 120 is formed by a variety of coating processes such as spin coating, dip coating and screen printing in step 503. Typically, film 120 is of a uniform thickness in the range of 100 nanometers to 1000 micrometers. For example, film 120 is proximately 0.5 mm in one preferred embodiment.

After step 503, film 120 undergoes drying, which can be aided by an oven in step 504. In one embodiment, film 120 is heated by an oven for between about 20 minutes to about 600 minutes at a temperature range of approximately 25 degrees Celsius to approximately 90 degrees Celsius. In one preferred embodiment, film 120 is heated by an oven for 120 minutes at a temperature of 60 degrees Celsius. Further, film 120 may be heated under a pressure range of substantially 0.001 atm to substantially 1 atm. Pores 121 are formed at this stage by degradation of a gas forming agent. Alternatively, prior to the annealing in oven, the pores can be formed by placing the film through a degassing step. This step causes dissolved gases to coalesce to form pores. Typically, pores 121 formed have sizes which range from substantially 100 nanometers to substantially 500 micrometers. One skilled in the art will recognise that pores 121 may be uniform or non-uniform in sizes and the exact sizes may a design choice controlled by varying the process. In addition, the density of pores 121 in film 120 is between preferably, approximately 5 to approximately 75 percent by volume. The characteristics of film 120 changes significantly in pressure range of substantially 0.5 kPa to 100 kPa.

The contacts are then added to form the pressure transducer in accordance to normal processes for adding such contacts in step 505.

The above is a description of one embodiment of a transducer in accordance with this invention. It is envisioned that those skilled in the art can and will design alternative embodiment of this invention that infringe on this invention as set forth in the followings claims.

What is claimed is:

1. A method of forming a film, comprising:
   forming a mixture including a polymer and a plurality of unordered nanomaterial;
   forming a film using said mixture;
   drying said film; and
   forming a plurality of pores within said film.

2. The method according to claim 1, wherein said nanomaterial is nanowires.

3. The method according to claim 1, wherein said polymer is electrically insulating.

4. The method according to claim 1, wherein said nanomaterial is carbon nanotubes.

5. The method according to claim 4, wherein said carbon nanotubes are electrically conducting.

6. The method according to claim 5, wherein said carbon nanotubes are multi-walled carbon nanotubes.

7. The method according to claim 5, wherein said carbon nanotubes are single-walled carbon nanotubes.

8. The method according to claim 5, wherein said carbon nanotubes contain a mixture of single-walled and multi-walled carbon nanotubes.

9. The method of claim 5 wherein said pores separate said nanotubes in said film.

10. The method according to claim 5, wherein said mixture includes a isopropyl alcohol.

11. The method according to claim 10, wherein said step of forming said pores comprises:
    evaporating said isoproplyl alcohol in said film to form said pores.

12. The method according to claim 10, wherein said film has a uniform thickness in the range of 100 nanometers to 1000 micrometers.

13. The method according to claim 12, wherein said film is 0.5 mm thick.

14. The method according to claim 12, wherein said step of drying said film comprises:
    heating said film for a predetermined amount of time at a predetermined temperature.

15. The method according to claim 14, wherein said step of heating comprises:
    heating said film for between about 20 to about 600 minutes.

16. The method according to claim 14, wherein said step of heating comprises:
    heating said film for 120 minutes.

17. The method according to claim 14, wherein said step of heating said film comprises:
    heating said film at a temperature between the range of about 25 to about 90 degrees Celsius.

18. The method according to claim 14, wherein said step of heating comprises:
    heating said film at a temperature of substantially 60 degrees Celsius.

19. The method according to claim 14, wherein said step of heating comprises:
    heating said film under a specified pressure.

20. The method according to claim 14, wherein said step of heating comprises:
    heating said film under a pressure in a range from substantially 0.001 to substantially 1 atm.

21. The method according to claim 14, wherein said pores have sizes which range from substantially 100 nanometers to 500 micrometers.

22. The method according to claim 21, wherein said pores have uniform sizes.

23. The method according to claim 21, wherein said pores have a range of sizes.

24. The method according to claim 21, wherein a density of said pores in said film is between 5 to 75 percent by volume.

25. The method according to claim 21, wherein characteristics of said film changes significantly in pressure range of substantially 0.5 kPa to 100 kPa.

* * * * *